United States Patent
Smaagard et al.

(10) Patent No.: US 12,236,190 B2
(45) Date of Patent: Feb. 25, 2025

(54) INTELLIGENT PHRASE DERIVATION GENERATION

(71) Applicant: Calabrio, Inc., Minneapolis, MN (US)

(72) Inventors: Kyle Smaagard, Forest Lake, MN (US); Matt Matsui, Minneapolis, MN (US); Boris Chaplin, Medina, MN (US); Paul Gordon, Minneapolis, MN (US); Dylan Morgan, Minneapolis, MN (US); Skyler Grammer, Minneapolis, MN (US); Chris Vanciu, Isle, MN (US)

(73) Assignee: Calabrio, Inc., Minneapolis, MN (US)

( * ) Notice: Subject to any disclaimer, the term of this patent is extended or adjusted under 35 U.S.C. 154(b) by 245 days.

(21) Appl. No.: 17/727,734

(22) Filed: Apr. 23, 2022

(65) Prior Publication Data

US 2022/0343071 A1    Oct. 27, 2022

Related U.S. Application Data

(60) Provisional application No. 63/178,743, filed on Apr. 23, 2021.

(51) Int. Cl.
| | | |
|---|---|---|
| G06F 17/00 | (2019.01) | |
| G06F 16/31 | (2019.01) | |
| G06F 40/247 | (2020.01) | |
| G06F 40/289 | (2020.01) | |

(52) U.S. Cl.
CPC ............ *G06F 40/247* (2020.01); *G06F 16/31* (2019.01); *G06F 40/289* (2020.01)

(58) Field of Classification Search
None
See application file for complete search history.

(56) References Cited

U.S. PATENT DOCUMENTS

| | | | | |
|---|---|---|---|---|
| 2018/0329883 A1* | 11/2018 | Leidner | .................. | G06F 40/30 |
| 2019/0237061 A1* | 8/2019 | Rusak | .................. | G06F 40/216 |
| 2020/0160199 A1* | 5/2020 | Al Hasan | .............. | G06N 20/00 |

* cited by examiner

*Primary Examiner* — Satwant K Singh
(74) *Attorney, Agent, or Firm* — Faegre Drinker Biddle & Reath LLP

(57) ABSTRACT

Disclosed herein are computer-implemented methods for intelligent phrase generation. Example methods include acquiring a bulk data input that includes one or more seed phrases that are requested for derivation, inputting the bulk data input into a model, and returning an arrangement result to a user. The model is configured to determine one or more derivative phrases from each of the seed phrases in the bulk data input, each of the one or more derivative phrases corresponding to a respective seed phrase. The model is configured to determine one or more arrangements with which to arrange each of the derivative phrases in the one or more derivative phrases. The model is configured to determine a characteristic of the respective seed phrase, the one or more arrangement corresponding to the characteristic of the respective seed phrase.

20 Claims, 3 Drawing Sheets

INTELLIGENT PHRASE DERIVATION GENERATION

CROSS-REFERENCE TO RELATED APPLICATION

This application claims priority to U.S. Provisional Application No. 63/178,743, filed Apr. 23, 2021, which is herein incorporated by reference in its entirety.

FIELD OF THE DISCLOSURE

The present disclosure relates to the field of computer technologies, and particularly, to devices, systems, and methods for intelligent phrase derivation and generation.

BACKGROUND

Contact centers manage omnichannel customer interactions from patrons. Some channels managed by contact centers include telephone (e.g., VoIP call), email, text, chat, and website interface services in which an agent interacts with the customer. The omnichannel nature of contact centers, however, results in large amounts of data from the customer interactions. Many contact centers employ tools before, during, and after customer interactions, for example, to help resolve customer issues (e.g., by managing call queues and automatic responses), to track customer interactions, to capture customer interaction and engagements, and to develop and analyze performance data. But many existing tools employ fairly binary logic as with most computer-implemented tools and, thus, deciphering and organizing data within its context remains a challenge.

Traditional methods of phrase derivation generation require time-intensive and unreliable techniques. For example, for a given phrase, a user must hard key alternative phrases, stemming, altering, and rearranging words and phrases therein. The quality of these alternative phrases, however, relies significantly upon the user's understanding of the language used. However they are generated, these alternative phrases can then be matched for use in various functions of a tool as described above. These matches are usually word-for-word text matches, which must match exactly, meaning there is minimal margin for error. As a result, if a user wants to accurately generate matches, they carefully must generate (e.g., varying tense, pluralization, pronoun, etc.) an exhaustive list of the alternative phrases to match every iteration of the desired phrase.

SUMMARY

The present disclosure relates to the field of computer technologies, and particularly, to devices, systems, and methods for intelligent phrase derivation and generation.

A first example of examples disclosed herein is a computer-implemented method for intelligent generation of one or more related alternative phrases. A method can include acquiring a bulk data input that includes one or more seed phrases that are requested for derivation, inputting the bulk data input into a model, and returning an arrangement result to a user. The model can be configured to determine one or more derivative phrases from each of the seed phrases in the bulk data input, each of the one or more derivative phrases corresponding to a respective seed phrase. The model can be configured to determine one or more arrangements with which to arrange each of the seed phrases in the one or more seed phrases and/or each of the derivative phrases in the one or more derivative phrases. The model can be configured to determine a characteristic of the respective seed phrase, the one or more arrangements corresponding to the characteristic of the respective seed phrase. The arrangement result can include the one or more derivative phrases in an arrangement of the one or more arrangements. The arrangement can indicate one or more recommended derivative phrases of the one or more derivative phrases.

In examples, the method can include arranging each of the one or more seed phrases and the one or more derivative phrases into the one or more arrangements based on the characteristic corresponding to each of the one or more seed phrases and the one or more derivative phrases. In examples, the characteristic can be an intent of the respective seed phrase. In examples, the bulk data input comprises at least one of a pre-populated list of seed phrases, a user-defined list of seed phrases, and a vendor-defined list of seed phrases.

In a second example of examples disclosed herein, a data processing system for intelligent generation of one or more related alternative phrases can include a memory for storing one or more modules and a processor configured to access the memory. The processor can be configured to process an acquisition module that is configured to acquire a bulk data input comprising one or more seed phrases that are requested for derivation. The processer can be configured to process an input module that is configured to input the bulk data input into a model. The processor can be configured to process an arrangement module that is configured to arrange each of the seed phrases in the one or more seed phrases and each of the derivative phrases in the one or more derivative phrases into the one or more arrangements based on the characteristic. The processer can be configured to process a results module that is configured to return an arrangement result to a user. The arrangement result can include the one or more derivative phrases in an arrangement of the one or more arrangements. The arrangement can indicate one or more recommended derivative phrases of the one or more derivative phrases.

The model can be configured to determine one or more derivative phrases from each of the seed phrases in the bulk data input, each of the one or more derivative phrases corresponding to a respective seed phrase. The model can be configured to determine one or more arrangements with which to arrange each of the seed phrases in the one or more seed phrases and/or each of the derivative phrases in the one or more derivative phrases. The model can be configured to determine a characteristic of the respective seed phrase, the one or more arrangements corresponding to the characteristic of the respective seed phrase. In examples, the data processing system can be a server running a private cloud platform or a multi-tenant platform. In examples, the one or more seed phrases can include one or more derivative phrases as previously determined by the model in a previous run of the model.

In a third example, the present disclosure includes a non-transitory computer-readable medium that stores instructions that, when executed by one or more processors, causes the one or more processors to perform one or more functions. The instructions can cause the processor to acquire a bulk data input comprising one or more seed phrases that are requested for derivation. The instructions can cause the processor to input the bulk data input into a model. The instructions can cause the processor to return an arrangement result to a user. The arrangement result can include the one or more derivative phrases in an arrangement of the one or more arrangements. The arrangement can indicate one or more recommended derivative phrases of the one or more derivative phrases.

The model can be configured to determine one or more derivative phrases from each of the seed phrases in the bulk data input, each of the one or more derivative phrases corresponding to a respective seed phrase. The model can be configured to determine one or more arrangements with which to arrange each of the seed phrases in the one or more seed phrases and/or each of the derivative phrases in the one or more derivative phrases. The model can be configured to determine a characteristic of the respective seed phrase. The one or more arrangements can correspond to the characteristic of the respective seed phrase.

In examples, the instructions, when executed by one or more processors, can cause the one or more processors to arrange each of the seed phrases and derivative phrases into the one or more arrangements based on the characteristic corresponding to each of the seed phrases and derivative phrases. The bulk data input can include at least one of a pre-populated list of seed phrases, a user-defined list of seed phrases, and a vendor-defined list of seed phrases.

Additional features and advantages of the present disclosure will become apparent to those skilled in the art upon consideration of the following detailed description of the illustrative examples exemplifying the disclosure as presently perceived.

BRIEF DESCRIPTION OF THE DRAWINGS

The above-mentioned and other features and advantages of this disclosure, and the manner of obtaining them, will become more apparent, and will be better understood by reference to the following description of the exemplary examples taken in conjunction with the accompanying drawings, wherein.

Figure 1:
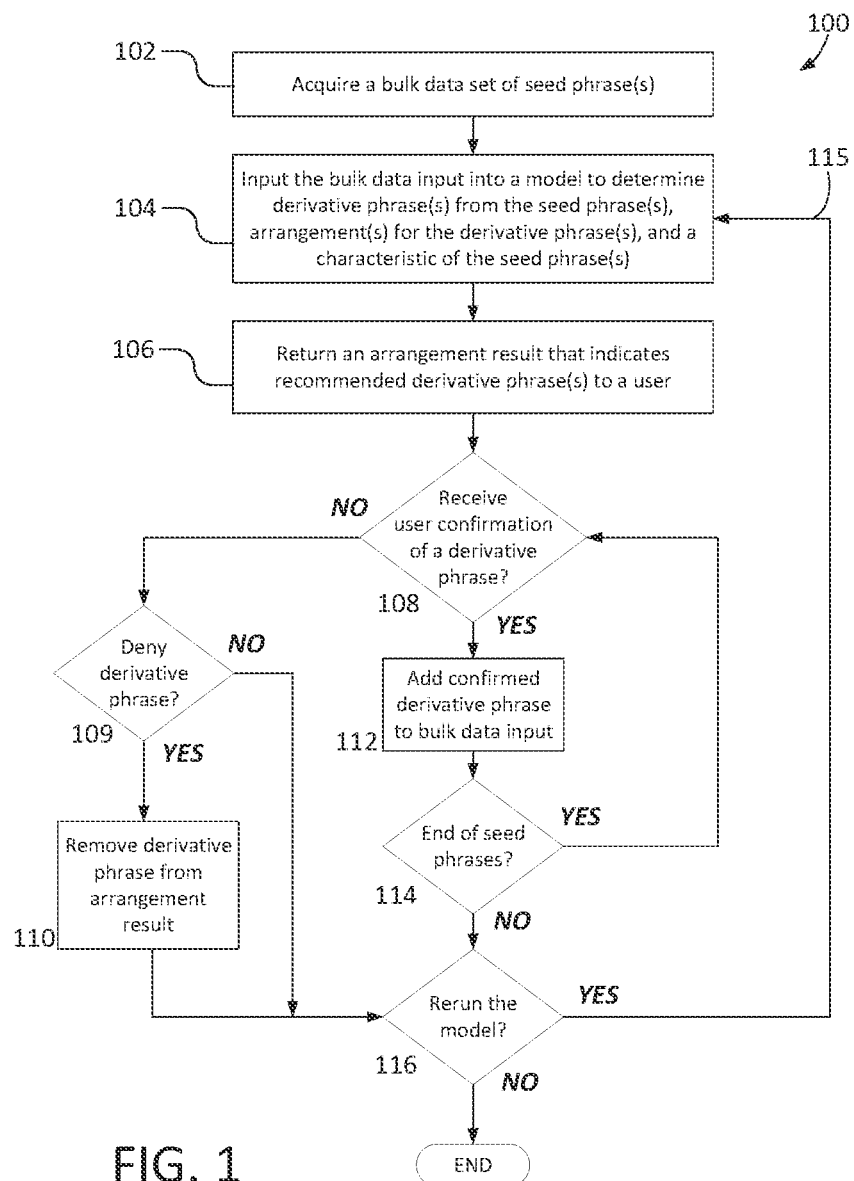
FIG. 1 is a flowchart of a method for intelligent phrase derivation generation, according to principles of the present disclosure.

Corresponding reference characters indicate corresponding parts throughout the several views. Although the drawings represent examples of various features and components according to the present disclosure, the drawings are not necessarily to scale and certain features can be exaggerated in order to better illustrate and explain the present disclosure. The exemplification set out herein illustrates an example of the disclosure, and such an exemplification is not to be construed as limiting the scope of the disclosure in any manner.

DETAILED DESCRIPTION OF THE DRAWINGS

For the purposes of promoting an understanding of the principles of the present disclosure, reference is now made to the examples illustrated in the drawings, which are described below. The exemplary examples disclosed herein are not intended to be exhaustive or to limit the disclosure to the precise form disclosed in the following detailed description. Rather, these exemplary examples were chosen and described so that others skilled in the art can utilize their teachings. It is not beyond the scope of this disclosure to have a number (e.g., all) the features in a given example to be used across all examples.

Disclosed herein are computer-implemented methods for intelligent phrase derivation generation. Such methods can be useful for generating one or more related alternative phrases from a given phrase. As illustrated in FIG. 1, a method 100 according to principles of the present disclosure can generally include, at step 102, acquiring a bulk data input that includes one or more seed phrases that are requested for derivation; at step 104, inputting the bulk data input into a model; and, at step 106, returning an arrangement result to a user. As further described below, a seed phrase can be a root grouping of words (e.g., a phrase or sentence), and a derivative phrase can be a substantially similar word or grouping of words derived from the seed phrases.

Remaining steps of the method 100 can modify the bulk data input or ultimately end the model. At step 108, the user can confirm a derivative phrase. If no confirmation is received at step 108, the method 100 can continue to step 109 where the user can decide whether to deny the derivative phrase. If the derivative phrase is denied at step 109, the derivative phrase is removed from the arrangement result at step 110 before continuing to step 116 where the user can decide whether to rerun the model. If, on the other hand, the derivative phrase is not denied (e.g., the user abstains) at step 109, the method 100 can also continue directly to step 116. If the model is not rerun at step 116, the method 100 can end, but if the model is rerun at step 116, the method 100 can return to step 104 via feedback loop 115.

If at step 108, however, the user confirms the derivative phrase, the method 100 can continue to step 112 where the confirmed derivative phrase is added to the bulk data input before continuing to step 114. At step 114, the user can observe whether there are any derivative phrases remaining. If there are seed phrases remaining at step 114, the method 100 can loop back to step 108 until the end of the derivative phrases before continuing to step 109. If there are no derivative phrases remaining at step 114, the method 100 can continue to step 116. If the model is not rerun at step 116, the method 100 can end, but if the model is rerun at step 116, the method 100 can return to step 104 via feedback loop 115. As noted above, at step 104, the method 100 can include inputting the bulk data input, which can include one or more seed phrases, into a model.

While illustrative, the method 100 is just an example of many examples disclosed herein, and one skilled in the art will recognize that many variations to the method can be made without departing from the scope of this disclosure. Many variations of the method 100 are discussed in further detail below, but for clarity and illustrative purposes, non-limiting example variations of the method 100 will briefly be discussed here. For instance, the method 100 can include handling derivative phrases in batches (e.g., groups of any number such as 1, 3, 7, 12, and the like) such that the user confirms a batch of derivative phrases at step 108. In certain instances, the method 100 can include serially stepping through individual derivative phrases alone or batched together. The method 100 can include any number of feedback loops and can run any number of steps via automated or user-intervention-guided processes. For instance, at step 116, the method 100 can include automated loops to generate more derivative phrases over an interval (e.g., number of iterations, time, etc.).

User intervention can optionally be prompted and/or received at each interval or at each step of the method. In addition, or in alternative, the system can have an automated acceptance threshold set. Under these circumstances, any recommended derivative phrases that meet a criteria (e.g., rating about how similar and/or different the derivative phrase is to the seed phrases) can be automatically accepted. This process ban be combined with manual processes or further automated by automatically iterating through the generation of additional derivative phrases. This process can then be run to a certain conclusion (e.g., number of phrases or iterations). In still more examples, any of these variations discussed herein can be taken alone or combined in any combination. It is intended that any of these instances and logical extensions thereof be included in the scope of this disclosure without being exhaustively discussed herein.

Seed phrases from the bulk data input can be manipulated into a useful output, resulting in phrase derivation generation, by the model. In examples, the model can be configured to prompt and receive a user input that confirms a derivative phrase of the one or more derivative phrases. In examples, the model can be configured to add the derivative phrase that has been confirmed into the arrangement of seed phrases. In examples, the method can include prompting and receiving a user input that confirms the one or more arrangements and a representative amount of each of the one or more seed phrases and the one or more derivative phrases in the one or more arrangements. In examples, the arrangement lists each derivative phrase in order of a number of respective seed phrases to which the derivative phrase corresponds such that a most recommended derivative phrase of the one or more recommended derivative phrases corresponds to the most respective seed phrases.

In this regard, the model can be configured to determine one or more derivative phrases from each of the seed phrases in the bulk data input. Each of the one or more derivative phrases can correspond to a respective seed phrase. The model can be configured to determine one or more arrangements with which to arrange each of the seed phrases in the one or more seed phrases and each of the derivative phrases in the one or more derivative phrases. The model can be configured to determine a characteristic of the respective seed phrase. The one or more arrangements can correspond to the characteristic of the respective seed phrase.

In examples, as alluded to above with respect to the method, the model can be configured to prompt and receive a user input that confirms the one or more derivative phrases. For example, the method 100 can include prompting and receiving a user input that confirms the one or more arrangements and a representative amount of each of the one or more seed phrases and/or the one or more derivative phrases in the one or more arrangements. In examples, the method 100 can include arranging each of the one or more seed phrases and/or the one or more derivative phrases into the one or more arrangements based on the characteristic corresponding to at least one of the one or more seed phrases and the one or more derivative phrases. The one or more arrangements can then be used (e.g., assigned) to calls (e.g., as labels or other references) for the model or other software in communication with the model. In an example, the arrangements can be categories and the method can be geared toward categorization, where intelligent phrase generation of the method 100 results in derivative phrases that are corresponding categories to categories used as seed phrases.

Intelligent phrase generation, e.g., of one or more related alternative phrases, can be achieved by employing artificial intelligence principles, such as machine learning or big data principles, into the model. Using a series of operations, the model can be trained to produce derivative phrases for seed phrases that it has not yet encountered. For instance, in a non-limiting example, the model that can be trained using a text-to-text model, meaning that the goal of the model is to take in a sequence of text and predict a new sequence of text. For the purposes of phrase suggestion, the model can be trained to paraphrase using a dataset of phrases and their corresponded paraphrase. A useful dataset for training can include a curated list of phrases that were commonly searched for by users of the model and their corresponding paraphrase. Such a dataset can include a dataset of QUORA™ questions and questions that had been flagged as duplicate questions (in this context a duplicate question can be a paraphrase because the user was asking the same question but in different language). In examples, the dataset can include a few thousand examples of phrases and their paraphrase for the model to learn the task of text paraphrasing.

In examples, the model can include an autoregressive, iterative algorithm configured to determine the one or more derivative phrases. Under these circumstances, the model can produce a distributed sample of derivative phrases. For instance, the model can produce a number (e.g., 2, 5, 10, 13, 15, 20) of derivative phrases for each seed phrase. In examples, the model can be configured to determine a degree of relationship between the characteristic of the respective seed phrase and that of each of the derivative phrases in the one or more derivative phrases that correspond to the respective seed phrase. The model can be configured to rank the one or more derivative phrases based on the degree of relationship. The number of derivative phrases can be grouped for each seed phrase, and the derivative phrase can be ranked in order by recurrence and presented to the user with the corresponding rank. While discussed here in terms of contextual rankings, one skilled in the art can understand that there are multiple ways to rank the resulting derivative phrases. As another example, in addition or in alternative to contextual rankings where ranking occurs by degree of relationship, the output results can be ranked by rate of occurrence of phrases in a set of historical data. In this regard, there can be an occurrence ranking based on how often the phrases occurred in a set of calls taken over a time period (e.g., weeks, months, years, and the like) by a contact center.

Accuracy of the model and results (e.g., arrangements, derivative phrases, or both) thereof can be improved by importing an increased number of related seed phrases for derivation. A single seed phrase may result in a less accurate derivative phrase or phrases. A larger initial bulk data input with an increased number of related seed phrases can increase accuracy of the model. Under these circumstances, accuracy of the model can also depend on the relationship between seed phrases as the model may use this relationship as a catalyst to inform the generation of derivative phrases from the seed phrases. In addition, user intervention in pairing a derivative phrase with an arrangement of seed phrases can increase the accuracy of the model. These derivative phrases can then become seed phrases for a new bulk data input into the model. For instance, the one or more seed phrases can include one or more derivative phrases as previously determined by the model in a previous run of the model. The model may be configured to loop (e.g., either intermittently or automatically via feedback loop 115) in this or a similar fashion to recommend more accurate derivative phrases until a satisfactory amount or complete overlapping of phrases occurs.

Models disclosed herein produce improved accuracy over traditional, more binary matching of words and phrases. As noted above, the seed phrases and derivative phrases can be arranged based on a characteristic thereof. In examples, the characteristic can be an intent or outcome of the respective seed phrase.

In examples, the bulk data input can be formed as a conversation transcript. The one or more derivative phrases can, for example, correspond to the respective seed phrase and to conversational context derived from surrounding phrases in the conversation transcript. Intent then can be a characteristic that represents an aggregate of each seed phrase (or some subset thereof) in the conversation transcript. The model can emphasize (e.g., rank higher than a nominal rank) the determined importance of phrases (e.g., based on frequency of use and proximity to other words or phrases such as the seed and derivative phrases) and optionally use this determination to inform the determination of intent. Similarly, outcome can then be a characteristic that represents a trajectory of the aggregate of each seed phrase (or some subset thereof) in the conversational transcript. In examples, the model can search for a conversation transcript history (e.g., a collection of conversation transcripts specific to a customer). The model can optionally deemphasize (e.g., rank higher than a nominal rank) the determined importance (e.g., via frequency and proximity to other words or phrases) of phrases (e.g., seed phrases and derivative phrases) and optionally use this determination to inform the determination of outcome.

In effect, the method 100 described above can provide substantially synonymous phrases based on the context of concatenated words, phrases, sentences, paragraphs, etc. By way of example, the method 100 can begin with two seed phrases: "I want to talk to your supervisor" and "May I speak with your manager." (As noted above, beginning with one seed phrase is possible, but may lead to less accurate results in initial runs of the model.) One skilled in the art will appreciate that these two seed phrases are phonetically and grammatically different, but their effect in context and desired outcome are similar. In examples, the model can determine and recommend a category of "Escalations" in this case. Using traditional methods, a user would have to hard key derivative phrases accounting for word stemming, grammatical errors, colloquial meanings, their individual interpretations, and the like to fill out the category. From the above seed phrases, as an example, the model can determine and rank the following derivative phrases, each of which arguably have substantially the same meaning: "I want to talk to your manager," "I want to talk to your supervisor," "I want to talk to your boss," "I want to speak to your manager," "I want to speak to your supervisor," "I want to speak to your boss," and "Take me to your leader." As will be appreciated, the model will rank or deemphasize "Take me to your leader" when compared to the other derivative phrases and optionally include the other derivative phrases in a subsequent bulk data input to be processed by the model.

Figure 2:
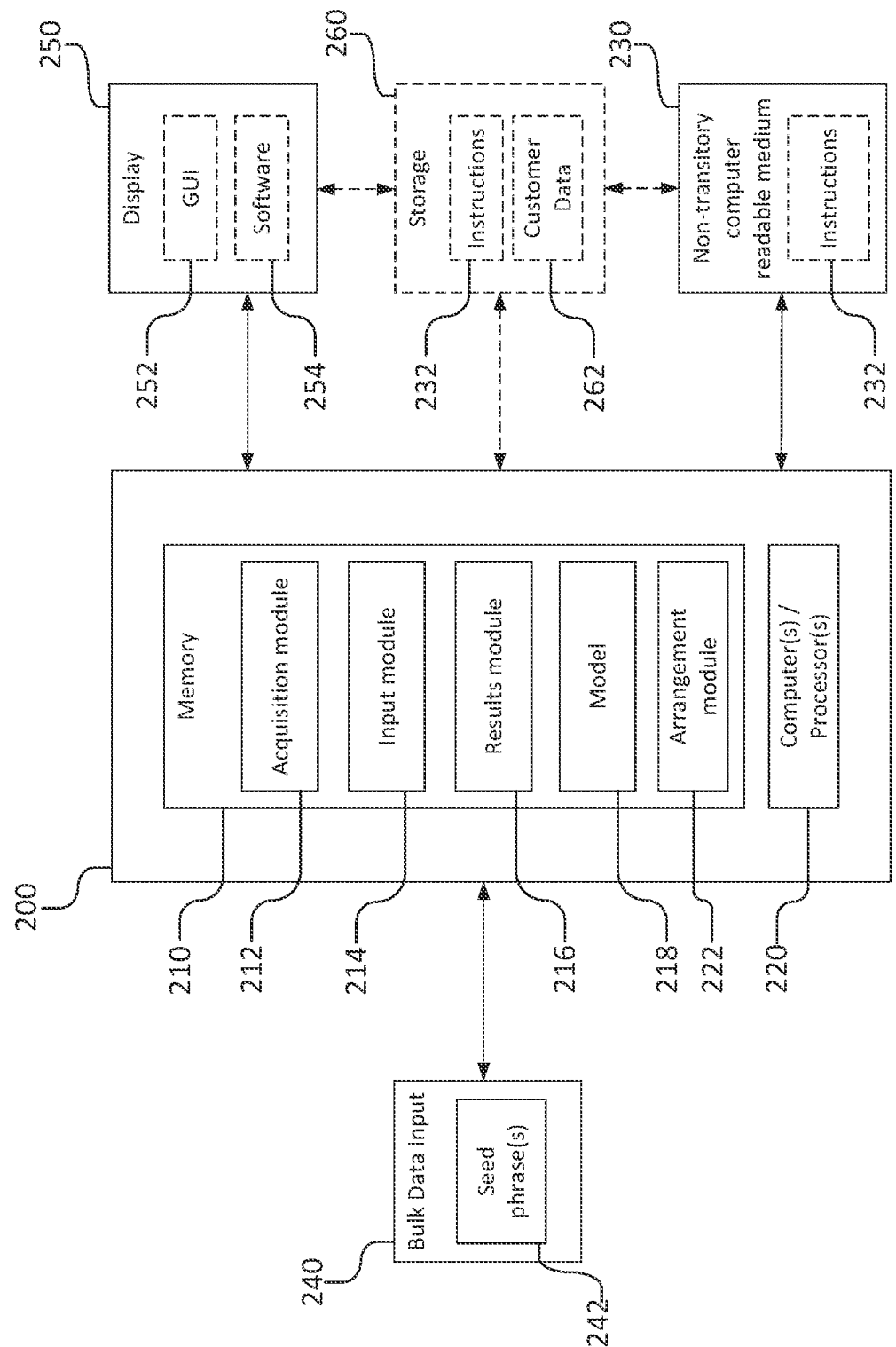
FIG. 2 is a block diagram schematic representation of a data processing system, according to principles of the present disclosure.

A data processing system 200 for intelligent generation of one or more related alternative phrases, as shown in FIG. 2, can employ principles of the present disclosure. For example, the data processing system 200 can include a memory 210 for storing one or more modules (e.g., an acquisition module 212, an input module 214, a results module 216, and an arrangement module 222) and a model 218. In addition, or in alternative, the data processing system 200 can include a processor 220 or a computer 220 configured to access the memory 210. In this regard, exemplary procedures in accordance with the present disclosure described herein can be performed by a processing arrangement (e.g., one or more processors 220), a computing arrangement (e.g., one or more computers 220), or both.

Such arrangements can be, e.g., entirely or a part of, or include, but not limited to, a computer 220, a processor 220, or both, each of which can include, e.g., one or more processors 220 (e.g., CPUs or microprocessors), and use a non-transitory computer-readable medium 230 (e.g., RAM, ROM, hard drive, or other storage device) with instructions 232 stored thereon. The processor 220 can be in communication with the display 250, which, according to some examples of the present disclosure, can be a touchscreen configured to input information to the processor 220 in addition to outputting information from the processor 220. Further, the display 250, the storage 260, or both can be used to display, store, or both display and store customer data 262 (e.g., conversation transcripts, categories, history of user input, etc.) in a format that is either or both user-readable and user-accessible.

Input for the data processing system 200 can be a bulk data input 240 that includes seed phrases 242. In examples, the bulk data input 240 can be provided via a storage device (e.g., a hard disk, floppy disk, memory stick, CD-ROM, RAM, ROM, etc., or a collection thereof) or user input (e.g., via the display 250). The processor 220 can be configured to process the acquisition module 212 that is configured to acquire the bulk data input 240 comprising one or more seed phrases 242 that are requested for derivation. The processer 220 can be configured to process the input module 214 that is configured to input the bulk data input 240 into the model 218. The model 218 can be stored in the memory 210 or otherwise in communication with the memory 210, the processor 220, or both. The processer 220 can be configured to process the results module 216 that is configured to return an arrangement result to a user. The processor 220 can be configured to process the arrangement module 222 that is configured to arrange each of the seed phrases in the one or more seed phrases and each of the derivative phrases in the one or more derivative phrases into the one or more arrangements based on the characteristic. The arrangement result can include the one or more derivative phrases in an arrangement of the one or more arrangements. The arrangement can indicate one or more recommended derivative phrases of the one or more derivative phrases. In examples, the data processing system 200 can include a display 250 that includes a graphic user interface 252 (GUI 252) and a software 254 as further described below. In examples, the display 250 is configured to present the arrangement result (e.g., as a ranked list, matrix, or the like) from the results module 216 and optionally allow for user input to confirm or modify the arrangement results and trigger subsequent runs of the model 218.

The model 218 shown in FIG. 2 can be substantially similar to and can include all the features of those described in relation to FIG. 1 in many respects. For example, the model 218 can be configured to determine one or more derivative phrases from each of the seed phrases 242 in the bulk data input 240. Each of the one or more derivative phrases can correspond to a respective seed phrase. The model 218 can be configured to determine one or more arrangements with which to arrange each of the seed phrases 242 in the one or more seed phrases 242 and each of the derivative phrases in the one or more derivative phrases. The model 218 can be configured to determine a characteristic of the respective seed phrase, the one or more arrangements corresponding to the characteristic of the respective seed phrase. In examples, the data processing system 200 can be a server running a private cloud platform or a multi-tenant platform.

Continuing with the example of FIG. 2, the one or more seed phrases 242 can include one or more derivative phrases as previously determined by the model 218 in a previous run of the model 218. In examples, the processor 220 can be configured to process the arrangement module 222 that is configured to arrange each of the seed phrases 242 in the one or more seed phrases 242 and each of the derivative phrases in the one or more derivative phrases into the one or more arrangements based on the characteristic corresponding to each of the seed phrases 242 and derivative phrases. The characteristic can be an intent of the respective seed phrase. The bulk data input 240 can be formed as a conversation transcript. The one or more derivative phrases can correspond to the respective seed phrase and to conversational context derived from surrounding phrases in the conversation transcript.

User intervention with the model 218 can be facilitated via the display 250. In examples, the input module 214 can be configured to determine a degree of relationship between the characteristic of the respective seed phrase and that of each of the derivative phrases in the one or more derivative phrases that correspond to the respective seed phrase. The input module 214 can be configured to rank the derivative phrases based on the degree of relationship. the input module 214 can be configured to prompt and receive a user input (e.g., via the display 250) that confirms the one or more arrangements and a representative amount of each of the seed phrases 242 and derivative phrases in the one or more arrangements. For example, the display 250 can include software 254 in communication with the server and the GUI 252 with which to prompt a user and receive a user input (e.g., an analog or digital input).

A non-transitory computer-readable medium 230 is also included in the present disclosure. The non-transitory computer-readable medium 230 can be, for example, a storage device such as a hard disk, floppy disk, memory stick, CD-ROM, RAM, ROM, etc., or a collection thereof. The non-transitory computer-readable medium 230 can be in communication with the processor 220 to perform numerous processes. The non-transitory computer-readable medium 230 can contain instructions 232 that are executable thereon. In addition, or in alternative, a storage 260 can be provided separately from the non-transitory computer-readable medium 230, which can provide the instructions 232 to the processor 220 so as to configure the processing arrangement to execute certain procedures, processes and methods, as described above. As shown in FIG. 2, each of the bulk data input 240, the memory 210, the computer 220/processor 220, the display 250, the storage 260, and the non-transitory computer-readable medium 230 can be in communication with each other.

The non-transitory computer-readable medium 230 can store the instructions 232 that, when executed by one or more processors 220, can cause the one or more processors 220 to perform one or more functions. The one or more instructions 232 can be substantially similar to those of the model 218 described above or cause the processor 220 to run the model 218 itself. For example, the instructions 232 can cause the processor 220 to acquire a bulk data input 240 comprising one or more seed phrases 242 that are requested for derivation. The instructions 232 can cause the processor 220 to input the bulk data input 240 into a model 218. The instructions 232 can cause the processor 220 to return an arrangement result to a user. The arrangement result can include the one or more derivative phrases in an arrangement of the one or more arrangements. The arrangement can indicate one or more recommended derivative phrases of the one or more derivative phrases. In this regard, the arrangement result can be a list, presentation of one or more derivative phrases, array, matrix, ordering, or another similar arrangement. It should be understood that an arrangement result that is randomly generated is not outside the scope of this disclosure.

In examples, the instructions 232, when executed by one or more processors 220, can cause the one or more processors 220 to arrange each of the seed phrases 242 and derivative phrases into the one or more arrangements based on the characteristic corresponding to each of the seed phrases 242 and derivative phrases. The bulk data input 240 can include at least one of a pre-populated list of seed phrases 242, a user-defined list of seed phrases 242, and a vendor-defined list of seed phrases 242. In examples, the model 218 can include an autoregressive algorithm configured to determine the derivative phrases. The bulk data input 240 can be formed as a conversation transcript.

Figure 3:
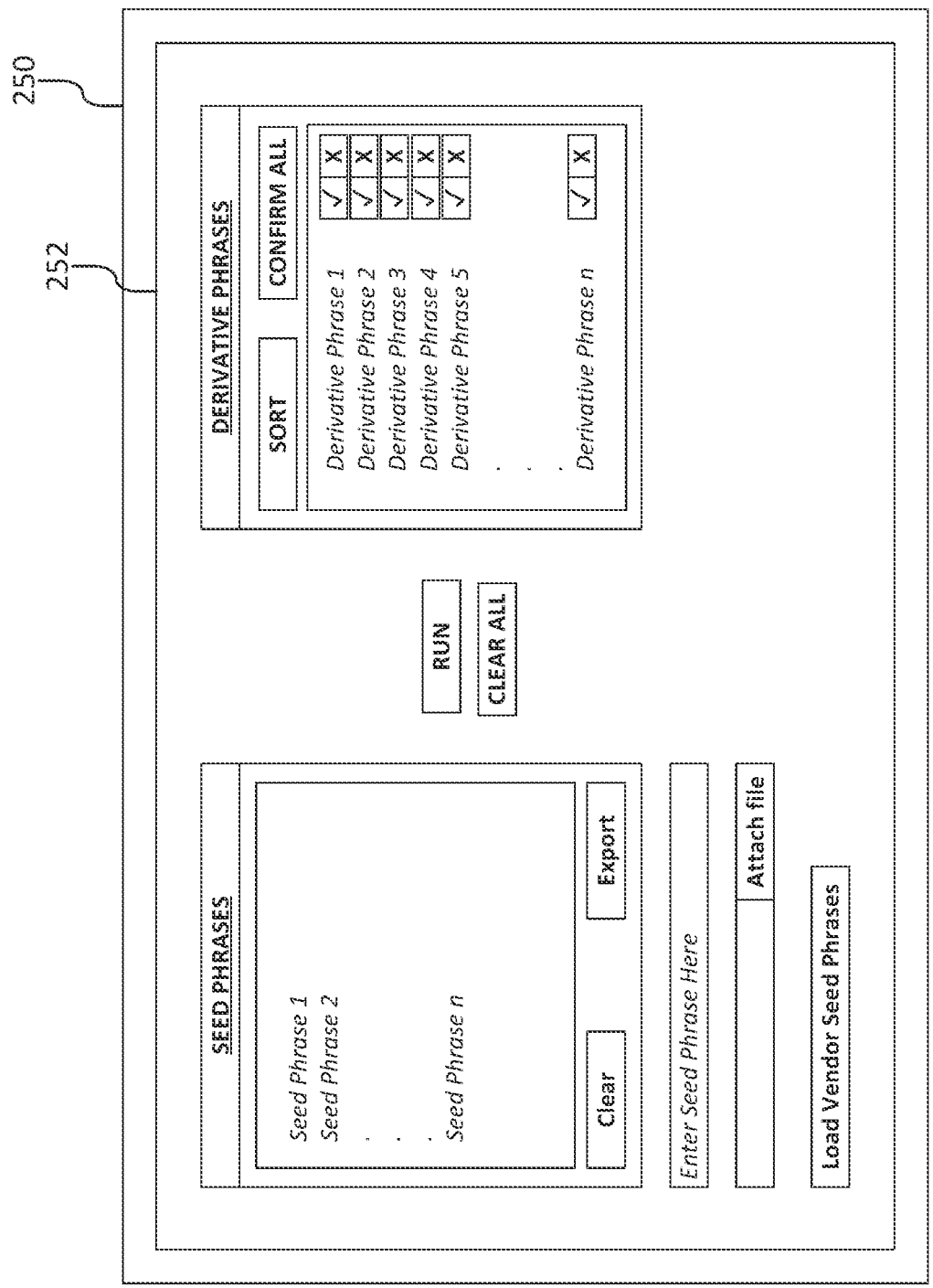
FIG. 3 is an illustration of a display with a GUI, according to principles of the present disclosure.

For discussion purposes, an example of a GUI 252 showing on a display 250 according to principles of the present disclosure is shown in FIG. 3. For discussion purposes only, the left and right sides of the figure will be referred to as such, and no such inferences should be drawn from these labels. Of course, one skilled in the art will appreciate that different arrangements of the features shown in the GUI 252 are possible without departing from the scope of this disclosure. As well, any features from the left side can be included in the right side and vice versa.

FIG. 3 shows an example of a GUI 252 that is configured for user interaction. As shown, the GUI 252 is displaying an arrangement result after the model has been run for derivation of seed phrases. As shown, an arrangement of seed phrases (e.g., "Seed Phrase 1," "Seed Phrase 2," through "Seed Phrase n") is shown on the left side of FIG. 3, and an arrangement of derivative phrases (e.g., "Derivative Phrase 1," "Derivative Phrase 2," through "Derivative Phrase n") is shown on the right side of FIG. 3. Prior to the run, a bulk data input was acquired (e.g., via manual entry by user input at "Enter Seed Phrase Here," via upload of a data file (e.g., CSV, TXT, ETC.), or via selection by user input at "Load Vendor Seed Phrases"). From the bulk data input, the model was run (e.g., using "RUN") to determine the derivative phrase and arrange the derivative phrases into the arrangement of derivative phrases based on a characteristic of the arrangement of seed phrases.

The arrangement of derivative phrases shown is a ranked list in descending order of recommendation such that the most recommended seed phrase is shown atop the list and the least recommended phrase will be at the bottom of the list. At this point, assuming that the model is run by a user for example, if the user is dissatisfied with the arrangement results, the bulk data input can be modified (e.g., by inputting additional seed phrases or by hitting "clear" to replace the seed phrases). If sufficiently modified, this new data input will produce a different arrangement result. Further at this point, if the user is satisfied with the arrangement results, the user may individually confirm (e.g., hit the check mark next to each derivative phrase) or deny (e.g., hit the "X") the derivative phrase or confirm all the derivative phrases (e.g., via "CONFIRM ALL"). Of course, one skilled in the art will appreciate that the "SORT" button may allow for sorting the list by a different characteristic or in a different order, for example. If the derivative phrase is confirmed, it may be moved to the arrangement of seed phrases on the left side of the GUI 252. If the derivative phrase is denied, it may be removed from the arrangement of derivative phrased on the right side of the GUI 252. If neither confirmed nor denied, the derivative phrase may remain in the arrangement of derivative phrases.

Continuing with the above example, the user can continue in this manner until satisfactory results are achieve. In this regard, the final output of the model can be the list of original seed phrase combined with derivative phrases that were confirmed after runs of the model. At this point, the user can export the final output (e.g., via "Export") to be used downstream. To restart the process entirely, the user can select "CLEAR ALL."

It is well understood that methods that include one or more steps, the order listed is not a limitation of the claim unless there are explicit or implicit statements to the contrary in the specification or claim itself. It is also well settled that the illustrated methods are just some examples of many examples disclosed, and certain steps can be added or omitted without departing from the scope of this disclosure. Such steps can include incorporating devices, systems, or methods or components thereof as well as what is well understood, routine, and conventional in the art.

The connecting lines shown in the various figures contained herein are intended to represent exemplary functional relationships and/or physical couplings between the various elements. It should be noted that many alternative or additional functional relationships or physical connections can be present in a practical system. However, the benefits, advantages, solutions to problems, and any elements that can cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone can be present in an example, B alone can be present in an example, C alone can be present in an example, or that any combination of the elements A, B or C can be present in a single example; for example, A and B, A and C, B and C, or A and B and C.

In the detailed description herein, references to "one example," "an example," "an exemplary example," etc., indicate that the example described can include a particular feature, structure, or characteristic, but every example can not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art with the benefit of the present disclosure to affect such feature, structure, or characteristic in connection with other examples whether or not explicitly described. After reading the description, it will be apparent to one skilled in the relevant art(s) how to implement the disclosure in alternative examples.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but can include other elements not expressly listed or inherent to such process, method, article, or apparatus While the present disclosure has been described as having an exemplary design, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practices in the art to which this disclosure pertains.

What is claimed is:

1. A computer-implemented method for intelligent generation of one or more related alternative phrases, the method comprising:
   acquiring a bulk data input comprising one or more seed phrases that are requested for derivation;
   inputting the bulk data input into a model configured to generate an input based on determining:
      one or more derivative phrases from each of the seed phrases in the bulk data input, each of the one or more derivative phrases corresponding to a respective seed phrase;
      one or more arrangements with which to arrange each of the derivative phrases in the one or more derivative phrases; and
      a characteristic of the respective seed phrase, the one or more arrangements corresponding to the characteristic of the respective seed phrase;
   providing the input to the model, the input is processed by the model to generate an arrangement result, the arrangement result including the one or more derivative phrases in an arrangement of the one or more arrangements, the arrangement indicating one or more recommended derivative phrases of the one or more derivative phrases; and
   returning the arrangement result to a user.

2. The method of claim 1, further comprising arranging each of the one or more seed phrases and the one or more derivative phrases into the one or more arrangements based on the characteristic.

3. The method of claim 2, wherein the characteristic is an intent of the respective seed phrase.

4. The method of claim 1, wherein the bulk data input comprises at least one of a pre-populated list of seed phrases, a user-defined list of seed phrases, and a vendor-defined list of seed phrases.

5. The method of claim 1, wherein the one or more seed phrases includes one or more derivative phrases as previously determined by the model in a previous run of the model.

6. The method of claim 1, wherein the model is further configured to determine a degree of relationship between the characteristic of the respective seed phrase and that of each of the derivative phrases in the one or more derivative phrases that correspond to the respective seed phrase and to rank the one or more derivative phrases based on the degree of relationship.

7. The method of claim 1, wherein the model comprises an autoregressive algorithm configured to determine the one or more derivative phrases.

8. The method of claim 1, wherein the bulk data input is formed as a conversation transcript.

9. The method of claim 8, wherein the one or more derivative phrases corresponds to the respective seed phrase and to conversational context derived from surrounding phrases in the conversation transcript.

10. The method of claim 1, wherein the model is configured to prompt and receive a user input that confirms a derivative phrase of the one or more derivative phrases, and wherein the model is further configured to add the derivative phrase that has been confirmed into the one or more seed phrases.

11. The method of claim 1, wherein the arrangement result lists each derivative phrase in order of a number of respective seed phrases to which the derivative phrase corresponds such that a most recommended derivative phrase of the one or more recommended derivative phrases corresponds to the most respective seed phrases.

12. A data processing system for intelligent generation of one or more related alternative phrases, the data processing system comprising:
- a memory for storing one or more modules;
- a processor configured to access the memory and to process:
  - an acquisition module that is configured to acquire a bulk data input comprising one or more seed phrases that are requested for derivation;
  - an input module that is configured to input the bulk data input into a model configured to generate an input based on determining:
    - one or more derivative phrases from each of the seed phrases in the bulk data input, each of the one or more derivative phrases corresponding to a respective seed phrase;
    - one or more arrangements with which to arrange each of the seed phrases in the one or more seed phrases and each of the derivative phrases in the one or more derivative phrases; and
    - a characteristic of the respective seed phrase, the one or more arrangements corresponding to the characteristic of the respective seed phrase; and
  - a results module that is configured to:
    - provide the input to the model, the input is processed by the model to generate an arrangement result, the arrangement result including the one or more derivative phrases in an arrangement of the one or more arrangements, the arrangement indicating a recommended derivative phrase of the one or more derivative phrases and
    - return the arrangement result to a user.

13. The data processing system of claim 12, wherein the data processing system is a server running a private cloud platform or a multi-tenant platform.

14. The data processing system of claim 12, wherein the one or more seed phrases includes one or more derivative phrases as previously determined by the model in a previous run of the model.

15. The data processing system of claim 12, wherein the processor is further configured to process an arrangement module that is configured to arrange each of the seed phrases in the one or more seed phrases and each of the derivative phrases in the one or more derivative phrases into the one or more arrangements based on the characteristic;
wherein the characteristic is an intent of the respective seed phrase;
wherein the bulk data input is formed as a conversation transcript; and
wherein the one or more derivative phrases corresponds to the respective seed phrase and to conversational context derived from surrounding phrases in the conversation transcript.

16. The data processing system of claim 12, wherein the input module is further configured to determine a degree of relationship between the characteristic of the respective seed phrase and that of each of the derivative phrases in the one or more derivative phrases that correspond to the respective seed phrase, to rank the derivative phrases based on the degree of relationship, and to prompt and receive a user input that confirms a derivative phrase of the one or more derivative phrases and a representative amount of each of the seed phrases and derivative phrases in the one or more arrangements.

17. The data processing system of claim 12, further comprising a display that is configured to present the arrangement result from the results module.

18. A non-transitory computer-readable medium that stores instructions that, when executed by one or more processors, causes the one or more processors to:
- acquire a bulk data input comprising one or more seed phrases that are requested for derivation;
- input the bulk data input into a model configured to generate an input based on determining:
  - one or more derivative phrases from each of the seed phrases in the bulk data input, each of the one or more derivative phrases corresponding to a respective seed phrase,
  - one or more arrangements with which to arrange each of the derivative phrases in the one or more derivative phrases, and
  - a characteristic of the respective seed phrase, the one or more arrangements corresponding to the characteristic of the respective seed phrase;
- provide the input to the model, the input is processed by the model to generate an arrangement result, the arrangement result including the one or more derivative phrases in an arrangement of the one or more arrangements, the arrangement indicating a recommended derivative phrase of the one or more derivative phrases; and
- return the arrangement result to a user.

19. The non-transitory computer-readable medium of claim 18, wherein the instructions, when executed by one or more processors, further cause the one or more processors to arrange each of the seed phrases and derivative phrases into the one or more arrangements based on the characteristic corresponding to each of the seed phrases, and wherein the bulk data input comprises at least one of a pre-populated list of seed phrases, a user-defined list of seed phrases, and a vendor-defined list of seed phrases.

20. The non-transitory computer-readable medium of claim 18, wherein the model comprises an autoregressive algorithm configured to determine the derivative phrases and wherein the bulk data input is formed as a conversation transcript.

* * * * *